(12) United States Patent
Ptasinski et al.

(10) Patent No.: US 7,987,499 B2
(45) Date of Patent: *Jul. 26, 2011

(54) METHOD AND SYSTEM FOR EXCHANGING SETUP CONFIGURATION PROTOCOL INFORMATION IN BEACON FRAMES IN A WLAN

(75) Inventors: Henry Ptasinski, San Francisco, CA (US); Edward Carter, Sunnyvale, CA (US); Manoj Thawani, Sunnyvale, CA (US); Manas Deb, San Jose, CA (US); Jeff Vadasz, Los Altos, CA (US); Mahesh Iyer, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1462 days.

This patent is subject to a terminal disclaimer.

(21) Appl. No.: 11/208,081

(22) Filed: Aug. 18, 2005

(65) Prior Publication Data
US 2006/0039341 A1 Feb. 23, 2006

Related U.S. Application Data

(60) Provisional application No. 60/602,396, filed on Aug. 18, 2004, provisional application No. 60/671,120, filed on Apr. 14, 2005.

(51) Int. Cl.
G06F 7/04 (2006.01)
G06F 15/16 (2006.01)
G06F 17/30 (2006.01)
H04L 29/06 (2006.01)

(52) U.S. Cl. ......................................... 726/3
(58) Field of Classification Search .................. 726/3, 6, 726/11, 22, 100, 10; 709/221; 380/248, 380/249, 247
See application file for complete search history.

(56) References Cited

U.S. PATENT DOCUMENTS

| 6,052,600 | A  | * | 4/2000  | Fette et al. ............... 455/509 |
| 6,201,958 | B1 | * | 3/2001  | Boucher .................. 455/411 |
| 6,477,150 | B1 | * | 11/2002 | Maggenti et al. .......... 370/312 |
| 6,779,069 | B1 | * | 8/2004  | Treichler et al. .......... 710/305 |
| 6,782,260 | B2 | * | 8/2004  | Nakakita et al. ......... 455/435.1 |
| 6,947,768 | B2 | * | 9/2005  | Adachi et al. ............ 455/560 |
| 6,983,167 | B2 | * | 1/2006  | Adachi et al. ............ 455/522 |
| 7,017,188 | B1 | * | 3/2006  | Schmeidler et al. ........ 726/26 |
| 7,028,097 | B2 | * | 4/2006  | Bard .................... 709/232 |
| 7,046,647 | B2 | * | 5/2006  | Oba et al. ............... 370/331 |

(Continued)

OTHER PUBLICATIONS

IEEE Std 802.11, 2003 Edition, "Information technology-Telecommunications and information exchange between systems-Local and metropolitan area networks-Specific requirements- Part 11: Wireless LAN Medium Access Control (MAC) and Physical Layer (PHY) Specifications", pp. 9-65, Jun. 12, 2003.

*Primary Examiner* — David Garcia Cervetti
(74) *Attorney, Agent, or Firm* — McAndrews, Held & Malloy, Ltd.

(57) ABSTRACT

Certain aspects of a method for enabling exchange of information in a secure communication system may comprise configuring at least one 802.11 client station via authentication enablement information comprising data that specifies a time period during which configuration is allowed. The data that specifies a time period during which configuration is allowed may comprise a configuration window open field, which indicates a period when a configuration setup window is open. At least one client station may be configured via the authentication enablement information comprising recently configured data, which indicates whether at least one configurator has configured at least one other client station within the time period during which the configuration is allowed.

24 Claims, 8 Drawing Sheets

U.S. PATENT DOCUMENTS

| | | | |
|---|---|---|---|
| 7,120,559 B1* | 10/2006 | Williams et al. | 702/185 |
| 7,149,308 B1* | 12/2006 | Fruehauf et al. | 380/44 |
| 7,263,105 B2* | 8/2007 | Trainin | 370/445 |
| 7,269,260 B2* | 9/2007 | Adachi et al. | 380/270 |
| 7,277,729 B2* | 10/2007 | Adachi et al. | 455/561 |
| 7,284,062 B2* | 10/2007 | Krantz et al. | 709/229 |
| 7,286,515 B2* | 10/2007 | Olson et al. | 370/338 |
| 7,299,063 B2* | 11/2007 | Kurihara | 455/513 |
| 7,302,256 B1* | 11/2007 | O'Hara et al. | 455/418 |
| 7,324,805 B2* | 1/2008 | Nakakita et al. | 455/411 |
| 7,327,690 B2* | 2/2008 | Billhartz | 370/245 |
| 7,328,451 B2* | 2/2008 | Aaron | 726/13 |
| 7,353,381 B2* | 4/2008 | Sheth et al. | 713/151 |
| 7,363,022 B2* | 4/2008 | Whelan et al. | 455/411 |
| 7,430,181 B1* | 9/2008 | Hong | 370/254 |
| 7,430,195 B2* | 9/2008 | Utsunomiya et al. | 370/338 |
| 7,508,801 B1* | 3/2009 | Calhoun et al. | 370/338 |
| 7,512,689 B2* | 3/2009 | Saint-Hilaire et al. | 709/227 |
| 7,516,025 B1* | 4/2009 | Williams et al. | 702/57 |
| 7,523,209 B1* | 4/2009 | Treichler et al. | 709/228 |
| 2002/0061748 A1* | 5/2002 | Nakakita et al. | 455/435 |
| 2002/0062451 A1* | 5/2002 | Scheidt et al. | 713/201 |
| 2002/0196764 A1* | 12/2002 | Shimizu | 370/338 |
| 2003/0012149 A1* | 1/2003 | Maggenti et al. | 370/260 |
| 2003/0036404 A1* | 2/2003 | Adachi et al. | 455/522 |
| 2003/0064752 A1* | 4/2003 | Adachi et al. | 455/560 |
| 2003/0119484 A1* | 6/2003 | Adachi et al. | 455/411 |
| 2003/0131082 A1* | 7/2003 | Kachi | 709/220 |
| 2003/0188006 A1* | 10/2003 | Bard | 709/232 |
| 2004/0028001 A1* | 2/2004 | Billhartz | 370/312 |
| 2004/0111520 A1* | 6/2004 | Krantz et al. | 709/229 |
| 2004/0120292 A1* | 6/2004 | Trainin | 370/338 |
| 2004/0136745 A1* | 7/2004 | Sato et al. | 399/82 |
| 2004/0198319 A1* | 10/2004 | Whelan et al. | 455/411 |
| 2004/0215957 A1* | 10/2004 | Moineau et al. | 713/153 |
| 2004/0242197 A1* | 12/2004 | Fontaine | 455/411 |
| 2004/0264429 A1* | 12/2004 | Tatara | 370/338 |
| 2004/0268150 A1* | 12/2004 | Aaron | 713/201 |
| 2005/0005013 A1* | 1/2005 | Saint-Hilaire et al. | 709/227 |
| 2005/0014503 A1* | 1/2005 | Nakakita et al. | 455/435.1 |
| 2005/0086465 A1* | 4/2005 | Sapkota et al. | 713/150 |
| 2005/0147071 A1* | 7/2005 | Karaoguz et al. | 370/338 |
| 2005/0160138 A1* | 7/2005 | Ishidoshiro | 709/203 |
| 2005/0163078 A1* | 7/2005 | Oba et al. | 370/331 |
| 2005/0198643 A1* | 9/2005 | Lachelt et al. | 718/106 |
| 2005/0245237 A1* | 11/2005 | Adachi et al. | 455/411 |
| 2005/0286075 A1* | 12/2005 | Ryu et al. | 358/1.15 |
| 2006/0013184 A1* | 1/2006 | Utsunomiya et al. | 370/343 |
| 2006/0040709 A1* | 2/2006 | Adachi et al. | 455/562.1 |
| 2006/0184794 A1* | 8/2006 | Desselle et al. | 713/166 |
| 2007/0077936 A1* | 4/2007 | Tomisawa et al. | 455/450 |
| 2007/0171870 A1* | 7/2007 | Oba et al. | 370/331 |
| 2007/0247366 A1* | 10/2007 | Smith et al. | 342/464 |
| 2008/0004076 A1* | 1/2008 | Adachi et al. | 455/560 |
| 2008/0295144 A1* | 11/2008 | Cam-Winget et al. | 726/1 |

* cited by examiner

METHOD AND SYSTEM FOR EXCHANGING SETUP CONFIGURATION PROTOCOL INFORMATION IN BEACON FRAMES IN A WLAN

CROSS-REFERENCE TO RELATED APPLICATIONS/INCORPORATION BY REFERENCE

This application makes reference to, claims priority to, and claims the benefit of:
U.S. Provisional Application Ser. No. 60/602,396 filed Aug. 18, 2004; and
U.S. Provisional Application Ser. No. 60/671,120 filed Apr. 14, 2005.

This application makes reference to:
U.S. application Ser. No. 11/207,302 filed Aug. 18, 2005;
U.S. application Ser. No. 11/207,262 filed Aug. 18, 2005;
U.S. application Ser. No. 11/207,658 filed Aug. 18, 2005;
U.S. application Ser. No. 11/208,310 filed Aug. 18, 2005;
U.S. application Ser. No. 11/208,275 filed Aug. 18, 2005;
U.S. application Ser. No. 11/208,346 filed Aug. 18, 2005;
U.S. application Ser. No. 11/207,661 filed Aug. 18, 2005;
U.S. application Ser. No. 11/207,301 filed Aug. 18, 2005, issued as U.S. Pat. No. 7,343,411 on Mar. 11, 2008;
U.S. application Ser. No. 11/208,284 filed Aug. 18, 2005; and
U.S. application Ser. No. 11/208,347 filed Aug. 18, 2005.

Each of the above referenced applications is hereby incorporated herein by reference in its entirety.

FIELD OF THE INVENTION

Certain embodiments of the invention relate to wireless network communication. More specifically, certain embodiments of the invention relate to a method and system for exchanging setup configuration protocol information in beacon frames in a WLAN.

BACKGROUND OF THE INVENTION

Currently, with some conventional systems, setting up a wireless network generally requires significant interaction and technical knowledge on the part of a user setting up the network, especially when the user is configuring security options for the network. For computer savvy users, the tasks associated with setting up a wireless network may be time consuming. However, for inexperienced computer users, the tasks associated with setting up a wireless network may be more challenging and consumes significantly greater time than required by computer savvy users.

In general, IEEE 802.11-based networks require a significant amount of user interaction during the configuration process. Typically, with conventional IEEE 802.11-based networks, the user needs to configure a station (STA) to associate to an access point (AP), which may require a number of settings to be selected on the STA, and some knowledge of the default configuration of the AP. The user may then access an HTML-based menu on the new AP in order to set various configuration parameters, many of which are difficult for novice and for intermediate users to understand and set correctly. New APs generally start with a configuration that provides no network security, and which utilize a default network name (SSID) that is selected by the manufacturer such as, for example, "Manufacturer Name", "Default", or "wireless". With the proliferation of IEEE 802.11 Wireless LAN (WLAN) networks, users often experience confusion and network problems when their new AP uses the same SSID as a neighboring AP. In order to facilitate communication between access points and access devices such as wireless STAs, various protocols are required. While the IEEE 802.11 WLAN standard provides a basis for implementing WLAN, it lacks various features that may be utilized to address the confusion, network problems and issues that users face when, for example, their new AP uses the same SSID as a neighboring AP.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for exchanging setup configuration protocol information in beacon frames in a WLAN, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects of a method for enabling exchange of information in a secure communication system may comprise configuring at least one WLAN client station via authentication enablement information comprising data that specifies a time period during which configuration is allowed. The data that specifies a time period during which configuration is allowed may comprise a configuration window open field, which indicates a period when a configuration setup window is open. At least one client station may be configured via the authentication enablement information comprising recently configured data, which indicates whether at least one configurator has configured at least one other client station within the time period during which the configuration is allowed.

Figure 1:
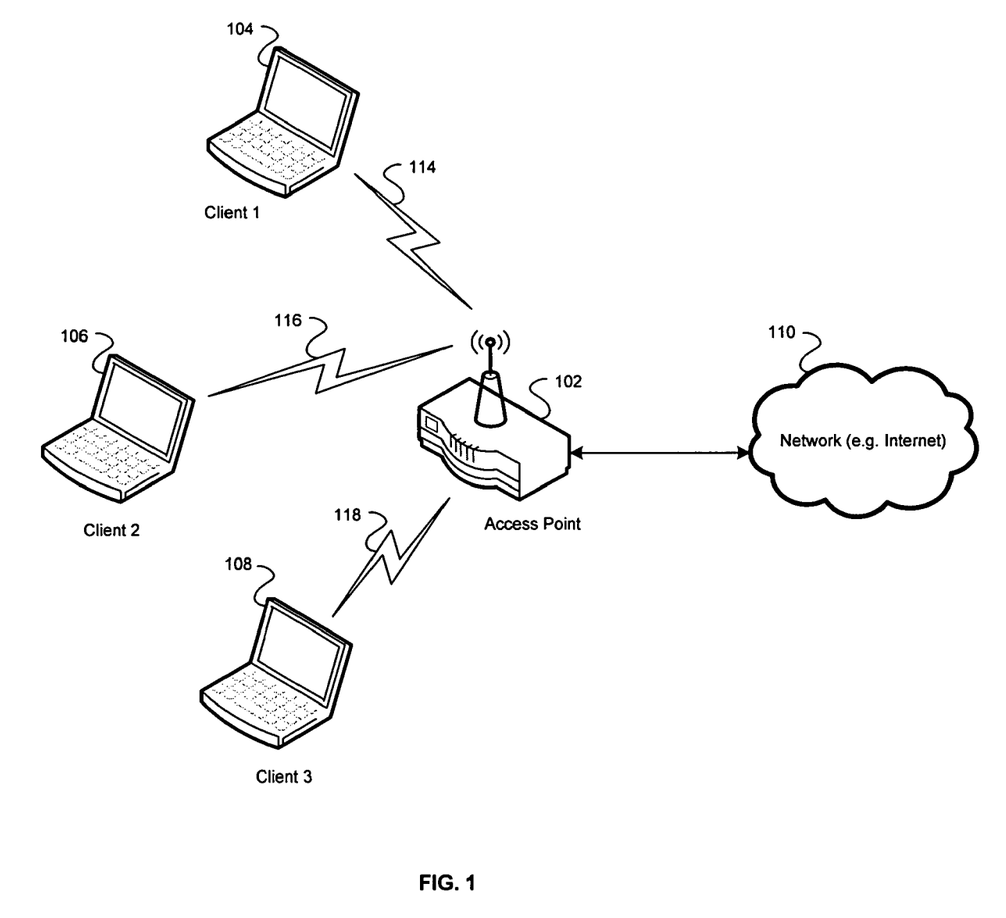
FIG. 1 is a block diagram of an exemplary wireless network, which may be utilized in connection with an embodiment of the invention.

FIG. 1 is a block diagram of an exemplary wireless network, which may be utilized in connection with an embodiment of the invention. Referring to FIG. 1, there is shown an access point (AP) 102, and a plurality of client stations (STA) 104, 106, and 108, a plurality of RF channels 114, 116, and 118, and a network 110. The AP 102 may be utilized as a configurator. The STAs 104, 106, and 108 may be wireless terminals such as a PC, a laptop, or a PDA with integrated or plug-in 801.11 capabilities. For example, the PC may utilize a wireless NIC card and the laptop or PDA may comprise integrated 801.11 capabilities. The network 110 may be a private or public network, for example, a service provider or the Internet.

In operation, in instances where the STAs 104, 106, and 108 are configured, they may communicate with the AP 102 via corresponding secure RF channels 114, 116, and 118, respectively. The AP 102 may communicate information received from a configured STA 104, 106, or 108 via the Internet 110. In instances where the STAs 104, 106, or 108 are unconfigured, they may communicate with the AP 102 functioning as a configurator to request configuration information. The AP 102 functioning as a configurator may configure a requesting STA 104, 106, or 108 via a corresponding RF channel 114, 116, or 118.

Figure 2:
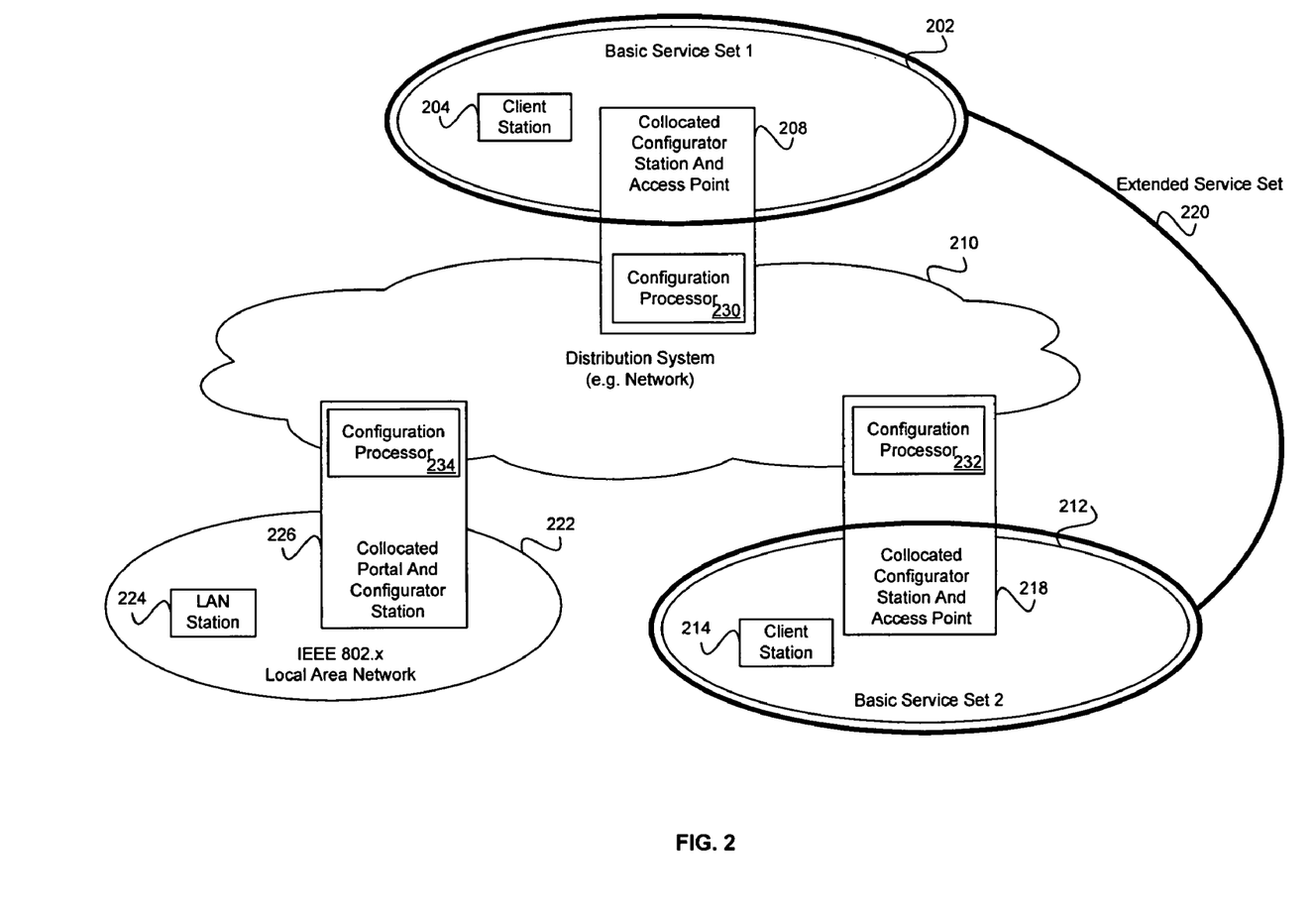
FIG. 2 is a block diagram of an exemplary system for wireless data communications comprising an ESS with collocation of configurators and access points (AP), in accordance with an embodiment of the invention.

FIG. 2 is a block diagram of an exemplary system for wireless data communications comprising an extended service set (ESS) with collocation of configurators and access points (AP), in accordance with an embodiment of the invention. With reference to FIG. 2 there is shown a distribution system (DS) 210, an extended service set (ESS) 220, and an IEEE 802 LAN 222. The ESS 220 may comprise a first basic service set (BSS) 202, and may include a second BSS 212, and may also include additional BSSs. The first BSS 202 may comprise a client station 204, and a collocated configurator station and access point 208. The collocated configurator station and access point 218 may comprise a configuration processor 230. The second BSS 212 may comprise a client station 214, and a collocated configurator station and access point 218. The collocated configurator station and access point 218 may comprise a configuration processor 232. The IEEE 802 LAN 222 may comprise a LAN station 224, and a collocated configurator station and access point 226. The collocated configurator station and access point 226 may comprise a configuration processor 234.

The collocated configurator station and access point 208 may be adapted to function as an access point or as a configurator station. Throughout this application, for simplicity, collocated configurator station and access point 208 may be referred to as collocated device 208. Accordingly, the collocated device 208 functioning as an access point refers to the collocated configurator station and access point 208 functioning as an access point. Additionally, the collocated device 208 functioning as a configurator refers to the collocated configurator station and access point 208 functioning as a configurator. The plurality of configuration processors, for example, configuration processor 230, 232 and 234 may comprise suitable logic, circuitry and code that may be adapted to use authentication enablement information comprising data that specifies a time period during which configuration of at least one WLAN client station, for example, client station 104 may be allowed.

A BSS 202 may comprise a plurality of proximately located stations that may communicate wirelessly, via a wireless medium. A BSS 202 that is also associated with an ESS 220 may be referred to as an infrastructure BSS. The wireless medium may comprise an RF channel. The ESS 220, comprising a plurality of BSSs, BSS 202 and BSS 212, for example, may be identified by a unique service set identifier (SSID). The portal 226 may also be a member in the ESS 220. Stations 204 and 214, associated with an ESS 220, may communicate via a wireless medium and/or via a distribution system medium, for example the DS 210. The DS 210 may comprise a distribution system medium that further comprises a wired medium and/or a wireless medium. A wired medium may comprise a physical communications channel that enables STA 204 to transmit information via a plurality of communications technologies, for example electrical or optical signals. In an IEEE 802.11 WLAN, the collocated configurator station and access point 208 or collocated configurator station and access point 218 may comprise the functionality of an AP and the functionality of a configurator. In an IEEE 802.11 WLAN, an AP may comprise the functionality of a station.

The collocated device 208 functioning as an AP, may enable STA 204 to transmit information via the DS 210. Portal 226 may enable a LAN station 224, which is located in a traditional IEEE 802 LAN, to communicate with an IEEE 802.11 STA 204, via the DS 210. A traditional IEEE 802 LAN may comprise a wired medium. An IEEE 802 LAN 222 may not comprise an IEEE 802.11 WLAN, for example BSS 202. The DS 210 may utilize media access control (MAC) layer IEEE 802 addressing and/or network layer addressing. If the DS 210 utilizes MAC layer IEEE 802 addressing, the collocated device 208 functioning as an AP, collocated configurator station and access point 218 functioning as an AP, and/or the portal 226 may comprise Ethernet switching device functionality. If the DS 210 utilizes network layer addressing, the collocated device 208 functioning as an AP, collocated configurator station and access point 218 functioning as an AP, and/or the portal 226 may comprise router functionality.

The collocated device 208 functioning as a configurator may configure a STA 204, thereby enabling the STA 204 to communicate wirelessly in a secure IEEE 802.11 network that utilizes encryption. The collocated device 208 functioning as a configurator, may configure a STA 204 by communicating information to the STA 204 comprising an SSID and an encryption key. The encryption key may also be referred to as a passphrase. A configured STA 204 may be authorized to utilize an IEEE 802.11 network based on the received configuration information from the collocated device 208 functioning as a configurator. A process by which the STA 204 is authenticated may comprise configuration of the STA 204. Various embodiments of the invention comprise a method and a system for configuring the STA 204 while requiring less manual intervention from a user than is the case with some conventional methods and/or systems for configuring the STA 204.

A non-AP station, for example, the client station 204 within the BSS 202 may subsequently form an association with the collocated device 208 functioning as an AP. The STA 204 may communicate an association request to the collocated device 208 functioning as an AP, based on the SSID that was received by the STA 204 during configuration. The collocated device 208 functioning as an AP, may communicate an association response to the STA 204 to indicate to the STA 204 the result of the association request. By associating with the collocated device 208 functioning as an AP, the station 204 may become a member of BSS 202. Furthermore, by obtaining membership in BSS 202, the STA 204 may become authorized to engage in secure wireless communication with other client stations in the ESS 220. Similarly, non-AP client station 214 within a BSS 212 may form an association with the collocated configurator station and access point 218 functioning as an AP, enabling the STA 214 to become a member of BSS 212.

Subsequent to the formation of an association between the client station 204 and the collocated device 208 functioning as an AP, the collocated device 208 functioning as an AP, may communicate accessibility information about the client station 204 to other APs associated with the ESS 220, such as the collocated configurator station and access point 218 functioning as an AP, and portals such as the portal 226. In turn, the collocated configurator station and access point 218 functioning as an AP, may communicate accessibility information about the client station 204 to stations in BSS 212. The portal 226, such as for example an Ethernet switch or other device in a LAN, may communicate reachability information about the client station 204 to stations in LAN 222, such as LAN station 224. The communication of reachability information about the client station 204 may enable stations that are not associated in BSS 202, but are associated in ESS 220, to communicate with the client station 204.

The DS 210 may provide an infrastructure that enables a client station 204 in one BSS 202, which has been authenticated and configured in accordance with various embodiments of the invention, to engage in a secure wireless communication with a client station 214 in another BSS 212. The DS 210 may also enable a client station 204 in one BSS 202 to communicate with a LAN station 224 in a non-IEEE 802.11 LAN 222, such as a wired LAN. The collocated device 208 functioning as an AP, collocated configurator station and access point 218 functioning as an AP, or portal 226 may provide a facility by which a station in a BSS 202, BSS 212, or LAN 222 may communicate information via the DS 210. The client station 204 in BSS 202 may communicate information to a client station 214 in BSS 212 by transmitting the information to collocated device 208 functioning as an AP. The collocated device 208 functioning as an AP may transmit the information via the DS 210 to the collocated configurator station and access point 218 functioning as an AP, which, in turn, may transmit the information to station 214 in BSS 212. The client station 204 may communicate information to a LAN station 224 in LAN 222 by transmitting the information to collocated device 208 functioning as an AP. The collocated device 208 functioning as an AP may transmit the information via the DS 210 to the portal 226, which, in turn, may transmit the information to the LAN station 224 in LAN 222.

Figure 3:
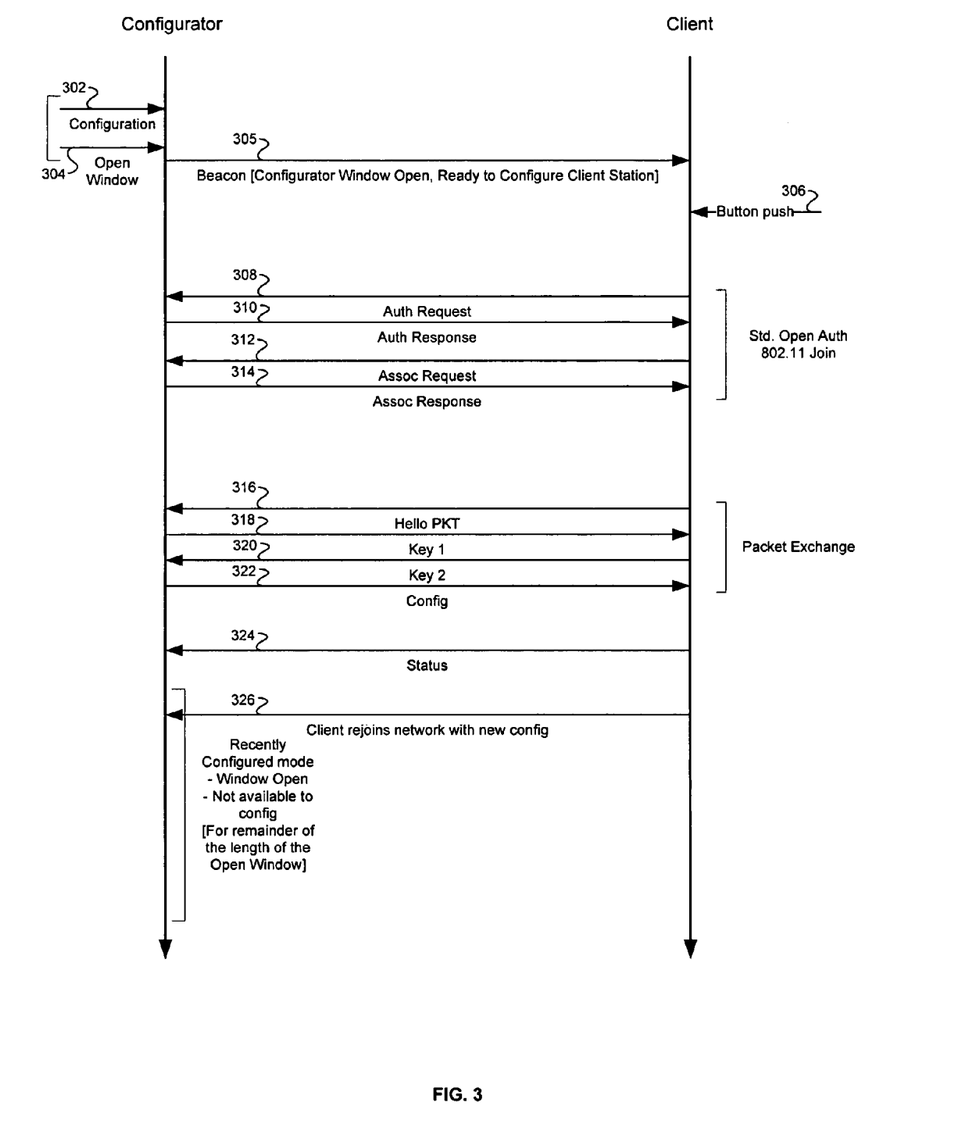
FIG. 3 is a diagram illustrating exemplary message exchanges based on a configuration protocol and initiated at the configurator, in accordance with an embodiment of the invention.

FIG. 3 is a diagram illustrating exemplary message exchanges based on a configuration protocol and initiated at the configurator, in accordance with an embodiment of the invention. FIG. 3 presents an exemplary exchange of messages between the collocated device 208 (FIG. 2) functioning as a configurator, and the client station 204, based on a configuration protocol. In step 302, the collocated device 208 functioning as a configurator, may be configured. A collocated device 208 functioning as a configurator, which is not configured to supply configuration information to a requesting client station 204 during authentication may be referred to as an unconfigured collocated device 208 functioning as a configurator. In an unconfigured collocated device 208 functioning as a configurator, activation of a button located thereon for a specified time duration may initiate step 302.

The time duration for which the button is activated may correspond to, for example, a "short" button activation. In instances where the collocated device 208 functions as a configurator, configuration may comprise entering an SSID, and/or entering a passphrase. The SSID and/or passphrase that is entered and/or generated during the configuration may subsequently be utilized when configuring client stations 204. If a passphrase is not entered, the configurator may be adapted to generate one, which may subsequently be utilized to configure client stations 204. The entered and/or generated configuration information may be stored in non-volatile memory, and/or in a storage device at the collocated device 208, for example. When the collocated device 208 functions as a configurator, it may retrieve the configuration information from the non-volatile memory and/or storage device and use it to configure client stations 204.

In a configured collocated device 208, functioning as a configurator, activation of the button thereon for a specific time duration may result in step 302 being bypassed, and step 304 initiated. The specific time duration for which the button is activated may correspond to, for example, a short button activation. In step 304, a configurator timing window may be opened at the collocated device 208 functioning as a configurator. The opening of the configurator timing window may correspond to the start of a time duration during which a client station 204 may be configured by the collocated device 208 functioning as a configurator. The time during which the configurator timing window remains open subsequent to a short button activation may be configured at the collocated device 208 functioning as a configurator.

In step 305, at a time instant subsequent to the opening of the configurator timing window in step 304, the collocated device 208 functioning as an AP, may transmit IEEE 802.11 beacon frames comprising authentication enablement information, in accordance with an embodiment of the invention. The authentication enablement information may comprise data that indicates when the configurator timing window is open, and that the collocated device 208 functioning as a configurator is ready to configure a client station 204. In one embodiment of the invention, the authentication enablement information may comprise a flag field, window_open, which may be set to a Boolean value to indicate whether the configurator timing window is open or closed. A logical value window_open=TRUE, or a numerical value window_open=1 may indicate that the configurator timing window is open, for example. A logical value window_open=FALSE, or a numerical value window_open=0 may indicate that the configurator timing window is closed, for example. The authentication enablement information may comprise a flag field, recently_cfg, which may be set to a Boolean value to indicate whether the collocated device 208 functioning as a configurator, is ready to configure a client station 204. A logical value recently_cfg=FALSE, or a numerical value recently_cfg=0 may indicate that the collocated device 208 functioning as a configurator, is ready to configure a client station 204, for example. A logical value recently_cfg=TRUE, or a numerical value recently_cfg=1 may indicate that the collocated device 208 functioning as a configurator, has already configured a client station 204 during the current configurator timing window open time interval and is not ready to configure a client station 204, for example.

At a time instant when a configurator timing window is opened, a subsequent first beacon message, associated with the step 305, transmitted by the collocated device 208 functioning as a configurator. The message, associated with the step 305, may comprise flags window_open=TRUE, indicating that the configurator timing window is open, and recently_cfg=FALSE, indicating that the collocated device 208 functioning as a configurator, is ready to configure a client station 204. Beacon frames transmitted by the collocated device 208 functioning as an AP, at instants in time during which the configurator timing window is not open may not comprise authentication enablement information. In step 305, these beacon frames may be received by a client station 204.

In a client station 204, activation of the button, located at a client station 204 may initiate step 306. In step 306, a client timing window may be opened at the client station 204. The opening of the client timing window may correspond to the start of a time duration in which a client station 204 may request to be configured by the collocated device 208 functioning as a configurator. The client station 204 may also start a discovery protocol. The discovery protocol comprises a process by which a client station 204 may locate a collocated device 208 functioning as a configurator, with which to initiate an authentication exchange. The client station 204 may scan beacon frames received from one or more collocated devices 208 functioning as either a configurator or an access point. A beacon frame collocated device 208 functioning as a configurator may comprise authentication enablement information. Subsequent to the opening of the client timing window, the client station 204 may communicate authentication response information to the collocated device 208 functioning as a configurator, via one or more messages associated with the steps 308, 312, 316, 320 and 324. The client station 204 may communicate the one or more messages, associated with the steps 308, 312, 316, 320 and 324, comprising authentication response information based on authentication enablement information contained in the transmitted beacon frame during a time interval in which the configurator timing window was open.

A button located at either the collocated device 208 functioning as a configurator, or the client station 204, may comprise a hardware button, for example a physical button, and/or a software enabled button, for example, a glyph or icon that is displayed in a user interface.

Steps 308, 310, 312, and 314 may comprise message exchanges based on IEEE 802.11 comprising an open authentication and join of a basic service set (BSS) as defined in IEEE 802.11. The BSS utilized during open authentication may utilize a different SSID than that utilized by the infrastructure BSS 202. In step 308, an authentication request message may be sent by the client station 204, to the collocated device 208 functioning as a configurator. In step 310, the collocated device 208 functioning as a configurator, may send an authentication response message to the client station 204. In step 312, the client station 204 may send an association request message, associated with the step 312, to the collocated device 208 functioning as a configurator. In step 314, the collocated device 208 functioning as a configurator, may send an association response message, associated with the step 314, to the client station 204.

Steps 316, 318, 320, and 322 may comprise a packet exchange based on a configuration protocol, in accordance with various embodiments of the invention. The packet exchange may utilize, but may not be limited to, the Diffie-Hellman (DH) protocol. In step 316, the client station 204 may communicate a hello packet to the collocated device 208 functioning as a configurator. The hello packet, associated with the step 316, may indicate to the collocated device 208 functioning as a configurator, that the client station 204 is ready to be configured. In step 318, the collocated device 208 functioning as a configurator, may communicate a key1 message to the client station 204. The key1 message, associated with the step 318, may comprise a configurator key. In step 320, the client station 204 may communicate a key2 message to the collocated device 208 functioning as a configurator. The key2 message, associated with the step 320, may comprise a client key.

In step 322, the collocated device 208 functioning as a configurator, may communicate a configuration message to the client station 204. The configuration message, associated with the step 322, may comprise configuration information that may be utilized to authenticate a client station 204. The configuration information communicated in the configuration message, associated with the step 322, may be encrypted based on the configurator key and/or the client key. In step 324, the client station 204 may communicate a status message to the collocated device 208 functioning as a configurator. The status message 324 may be sent subsequent to decryption of at least a portion of the configuration message 322. The client station 204 may utilize the configurator key and/or the client key to decrypt at least a portion of the configuration message, associated with the step 322 that was previously encrypted by the collocated device 208 functioning as a configurator. The status message, associated with the step 324, may indicate whether the client station 204 was successfully configured during the packet exchange. If the client station was successfully configured, the status message, associated with the step 324, may indicate success. The collocated device 208 functioning as a configurator, may store authentication information about the configured client 204 in persistent memory. Persistent memory may comprise any of a plurality of device storage technologies that may be utilized to maintain information about the configured client station 204 until action is taken to release the stored information from persistent memory. These actions may comprise manual intervention at the collocated device 208 functioning as a configurator, by a user, or automatic intervention by a software process executing at the configurator.

In step 326, the client station 204 may rejoin the WLAN based on the received configuration information. The steps performed during the rejoin, associated with the step 326, may be substantially as defined in IEEE 802.11. The rejoin, associated with the step 326, may occur via a secure RF channel that utilizes the received configuration information in step 322. For example, the rejoin, associated with the step 326, may utilize the SSID that was received by the client station during the packet exchange. Subsequent to configuration of the client station 204, the collocated device 208 functioning as a configurator, may not be available to configure another client station 106 during the current configurator registration window time interval. Beacon frames may be transmitted by the collocated device 208 functioning as an AP, subsequent to the configuration of the client station 204. These beacon frames may comprise information that indicates that the configurator timing window is closed, and that the collocated device 208 functioning as a configurator, has already configured a client station 204 during the current configurator timing window open time duration. This may indicate to a subsequent client station 204 that receives the beacon frames that the collocated device 208 functioning as a configurator, is not currently ready to configure a client station 204.

In various embodiments of the invention, the packet exchange, comprising the steps 316, 318, 320, 322 and 324, may be performed by a collocated device 208 functioning as a configurator, and a client station 204 that communicate wirelessly, via a wireless medium. The collocated device 208 functioning as a configurator, and client station 204 may also communicate during the packet exchange via a wired medium, for example, via an Ethernet LAN 222. If the collocated device 208 functioning as a configurator, receives a packet, for example an authentication request, associated with the step 308, from the client station 204, via a wireless medium, subsequent packet exchanges between the collocated device 208 functioning as a configurator, and client station 204 may be communicated wirelessly. If the collocated device 208 functioning as a configurator receives a packet from the client station 204, via a wired medium, subsequent packet exchanges between the collocated device 208 functioning as a configurator, and client station 204 may be communicated via a wired medium. The received packet may be, for example, a hello packet, associated with the step 316.

In operation, if the time duration for button activation at the collocated device 208 functioning as a configurator, corresponds to a "long" button activation, the collocated device 208 functioning as a configurator, may generate a new SSID and/or passphrase. The new SSID and/or passphrase may replace an SSID and/or passphrase that was stored in the collocated device 208 functioning as a configurator, as configuration information prior to the long button activation. For either a configured, or unconfigured collocated device 208 functioning as a configurator, a long button activation may initiate step 302. Subsequent to a long button activation, the configurator may also release, from persistent memory, configuration information pertaining to previously configured client stations 204. As a consequence, previously configured client stations 204 may lose the ability to engage in secure wireless communications via the BSS 202 or ESS 220. The client stations 204 may be required to repeat the process of authentication with a collocated device 208 functioning as a configurator, to regain the ability to engage in secure wireless communications via the BSS 202 or ESS 220.

The exchange of authentication enablement information, authentication response information and configuration information in messages associated with the steps 305, 308, 310, 312, 314, 316, 318, 320, 322 and 324, between a collocated device 208 functioning as a configurator, and a client station 204, may occur within a time duration in which the configurator timing window is open. The configurator timing window is closed after a time interval corresponding to a configurator timing window open duration lapses or ends. The exchange of authentication enablement information, authentication response information and configuration information, in messages associated with the steps 305, 308, 310, 312, 314, 316, 318, 320, 322 and 324, between a collocated device 208 functioning as a configurator, and a client station 204, may occur within a time duration in which the client timing window is open. After a time interval corresponding to a client timing window open duration lapses, the client timing window is closed.

Figure 4:
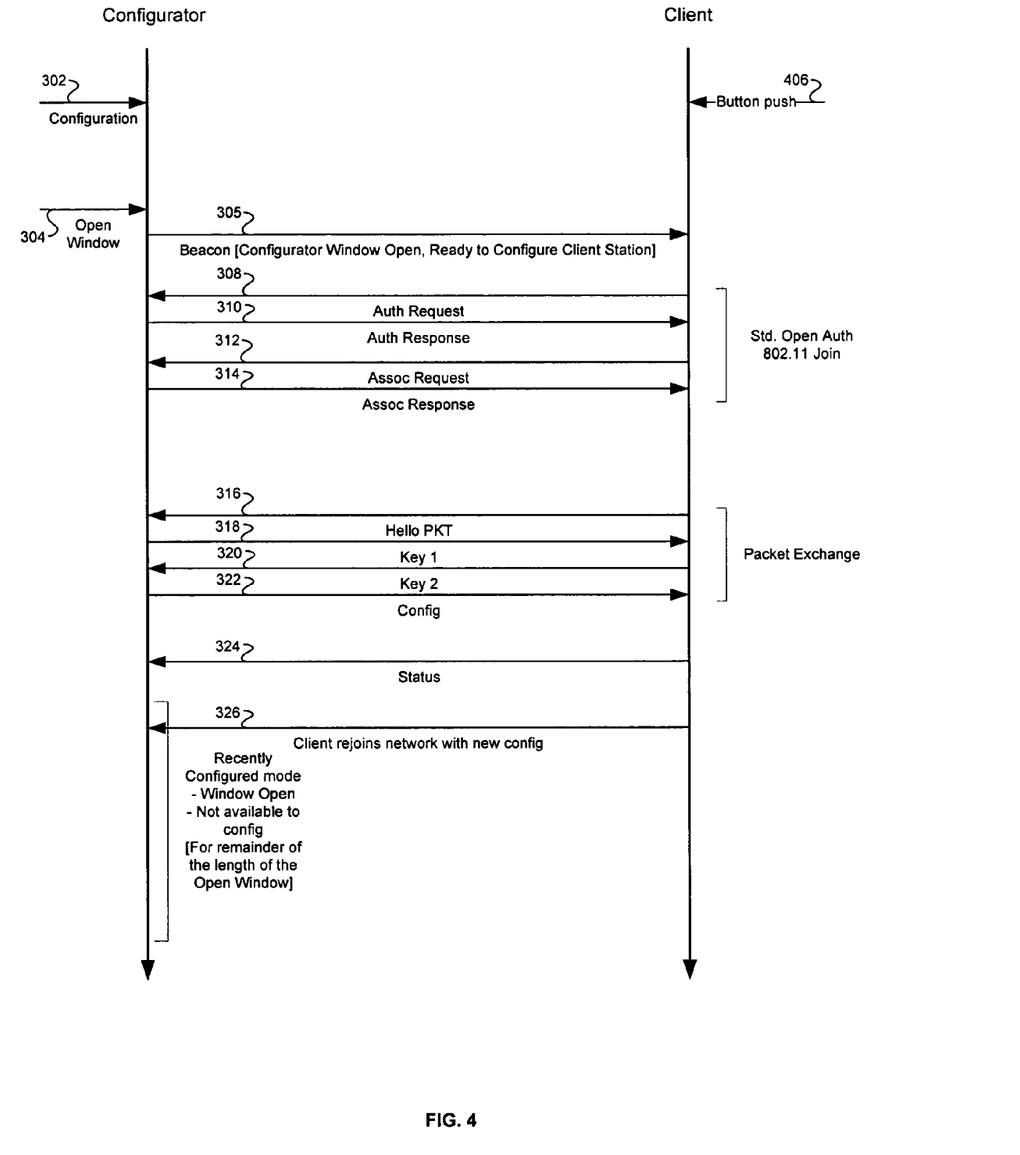
FIG. 4 is a diagram illustrating exemplary message exchanges based on a configuration protocol and initiated at the client station, in accordance with an embodiment of the invention.

FIG. 4 is a diagram illustrating exemplary message exchanges based on a configuration protocol and initiated at the client station, in accordance with an embodiment of the invention. FIG. 4 is substantially as described in FIG. 3 with the exception that the button activation occurs at the client station 204, to open the client timing window, at a time instant prior to a time instant at which the button activation occurs at the collocated device 208 functioning as a configurator, to open the configurator timing window. Subsequent to the button activation to open the client timing window, associated with the step 406, at the client station 204, the client station 204 may wait to receive a beacon frame, associated with the step 305. The beacon frame, associated with the step 305, may comprise authentication enablement information from the collocated device 208 functioning as an AP, prior to proceeding with step 308. If the client station 204 had previously received, and stored, a beacon frame comprising authentication enablement information, the client station 204 may communicate an authentication request message 308 to a collocated device 208 functioning as a configurator, that transmitted the previously received beacon frame to the client station 204. The client station 204 may not wait to receive a beacon frame, associated with the step 305, that was transmitted by a collocated device 208 functioning as a configurator, subsequent to the button activation, associated with the step 406, at the client station 204. Subsequent message exchanges in FIG. 4 are substantially as described for FIG. 3.

Figure 5A:
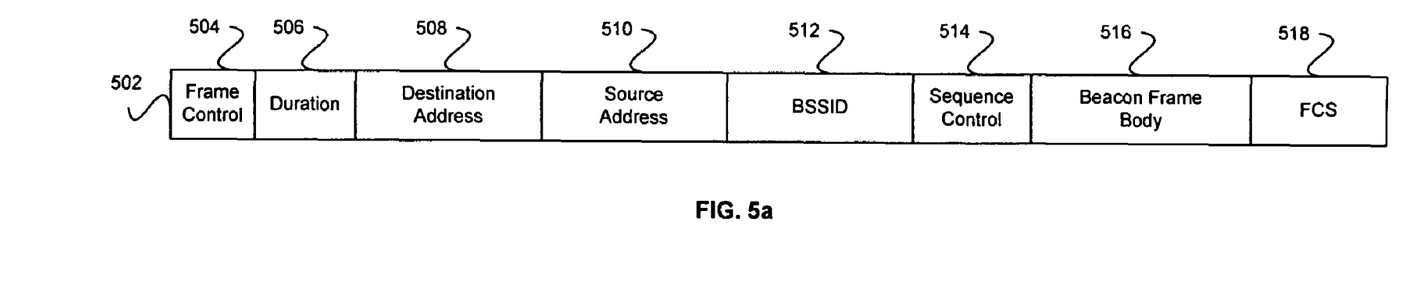
FIG. 5a is a block diagram for an exemplary beacon frame format, in accordance with an embodiment of the invention.

FIG. 5a is a diagram of an exemplary beacon frame format, in accordance with an embodiment of the invention. With reference to FIG. 5a there is shown a beacon frame format 502. The beacon frame 502 may comprise a frame control field 504, a duration field 506, a destination address field 508, a source address field 510, a BSSID field 512, a sequence control field 514, a beacon frame body 516, and a frame check sequence (FCS) 518. The format of the beacon frame may be based on specifications contained in IEEE standard 802.11.

The frame control field 504 may comprise information that identifies the frame as being a beacon frame. The duration field 506 may comprise information indicating the amount of time that is to be allocated for transmitting the beacon frame 502 and for receiving an acknowledgement of transmission. The destination address field 508 may comprise information identifying an address of one or more stations, such as, for example, client station 204, that are intended to receive the beacon frame 502. The source address field 510 may comprise information identifying the address of the station that transmitted the beacon frame 502. The BSSID field 512 may comprise information identifying the address of an AP that is a current member of the basic service set (BSS), such as, for example BSS 102. The sequence control field 514 may be utilized to identify a beacon frame that may be a segment within a larger protocol data unit (PDU). The beacon frame body 516 may comprise information that is specific to a beacon frame. The frame check sequence (FCS) field 518 may be utilized to detect errors in a received beacon frame 502.

In operation, the beacon frame 502 may be communicated by an AP, such as, for example, AP 108, in a BSS, such as, for example, BSS 102. The beacon frame may enable stations within a BSS to locate an AP within the ESS. A station that is not a current member of the BSS may establish an association with the AP based on the BSSID field.

Figure 5B:
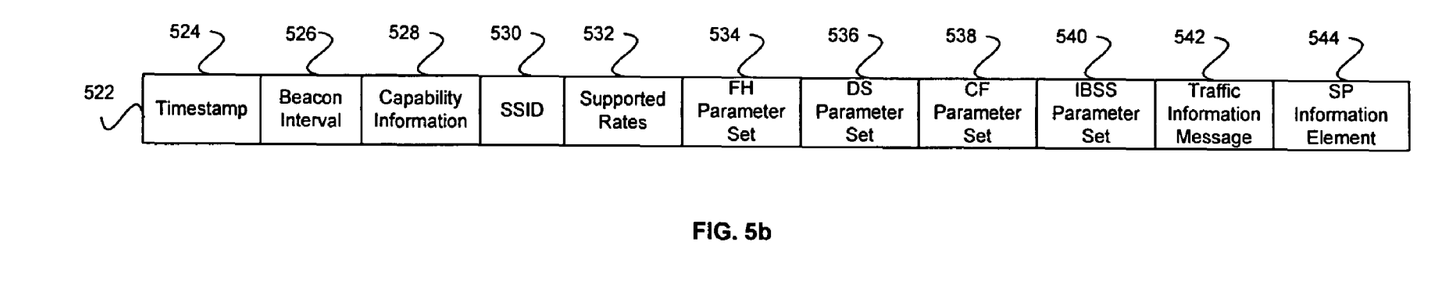
FIG. 5b is a block diagram for an exemplary beacon frame body format, in accordance with an embodiment of the invention.

FIG. 5b is a diagram of an exemplary beacon frame body format, in accordance with an embodiment of the invention. With reference to FIG. 5b, there is shown a beacon frame body format 522. The beacon frame body format 522 may comprise a timestamp field 524, a beacon interval field 526, a capability information field 528, a SSID field 530, a supported rates field 532, a frequency hopping (FH) parameter set field 534, a direct sequence spread spectrum parameter set field 536, a contention free (CF) parameter set field 538, an independent BSS (IBSS) parameter set field 540, a traffic information message field 542, and a setup configuration protocol (SP) information element (IE) field 544.

The timestamp field 524 may indicate a time at which the beacon frame was transmitted. The beacon interval field 526 may indicate the amount of time that may transpire between beacon frame transmissions. The capability information field 528 may be used to communicate capabilities related to a station, such as, for example, client station 104, that transmits the beacon frame. The SSID field 530 may identify ESS membership information of the station, such as, for example, client station 104, transmitting the beacon. The supported rates field 532 may indicate data rates that may be supported by the station that transmitted the beacon frame. The FH parameter set field 534 may comprise information about stations that utilize frequency hopping. The DH parameter set field 536 may comprise information about stations that utilize direct sequence spread spectrum. The CF parameter set field 538 may comprise information about APs, such as, for example, AP 108, that support contention free polling of stations in a BSS such as, for example, BSS 202. The IBSS parameter set 540 may comprise information about stations that are members of an IBSS that do not comprise an AP and do not access stations outside of the BSS via a DS such as, for example, DS 110. The SP IE field 544 may comprise authorization enablement information that is utilized by a configuration protocol.

In operation, a configurator, such as, for example, AP 102 functioning as a AP 102 functioning as a configurator station 102, may transmit a beacon frame comprising the SP information element field 544. A station within a BSS may identify a configurator based on the source address field 510 of the beacon frame, and based upon the presence of a SP information element 544 in the beacon frame body 516. The SP information element may comprise information that is not specified in IEEE standard 802.11. Ethernet frames that comprise the SP information element may be identified based on the Ethertype field in the Ethernet frame header, where the Ethernet frame header may be as specified in IEEE 802.

Figure 6A:
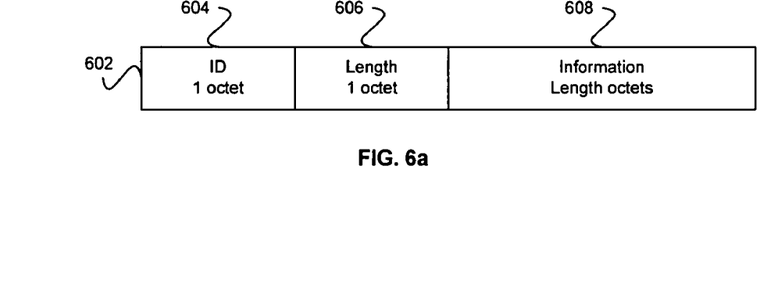
FIG. 6a is a block diagram for an exemplary IEEE 802.11 information element format, in accordance with an embodiment of the invention.

FIG. 6a is a diagram of an exemplary IEEE 802.11 information element format, in accordance with an embodiment of the invention. With reference to FIG. 6a, there is shown an IEEE 802.11 information element (IE) 602. The IEEE 802.11 IE 602 may comprise an identifier field (ID) 604, a length field 606, and an information field 608. The ID field 604 may comprise 1 octet of binary information, for example. The length field 606 may comprise 1 octet of binary information, for example. The information field 608 may comprise a plurality of octets of a number specified in the length field 606.

Figure 6B:
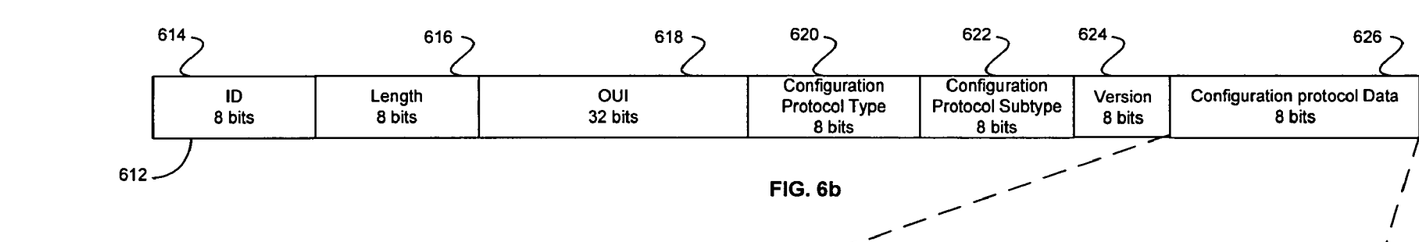
FIG. 6b is a diagram of an exemplary configuration protocol information element, in accordance with an embodiment of the invention.

FIG. 6b is a diagram of an exemplary configuration protocol information element, in accordance with an embodiment of the invention. With reference to FIG. 6b, there is shown a setup configuration protocol (SP) IE 612. The SP IE 612 may comprise an ID field 614, a length field 616, an organizational unique identifier (OUI) field 618, a configuration protocol type field 620, a configuration protocol subtype field 622, a version field 624 and a data field 626. The format of the SP IE 612 may be based on the IEEE 802.11 IE 602. The ID field 614 may comprise 8 bits of binary information, for example, and may comprise a value suitable for uniquely identifying the information element as being utilized for setup. The length field 616 may comprise 8 bits of binary information, for example. The OUI field 618 may comprise 24 bits of binary information, for example, and may comprise a value suitable for unique identification.

When the configuration protocol window is opened by the configurator, for example, the AP 102 functioning as a configurator, the AP 102 may indicate this event to the other stations connected to the ESS, for example, ESS 220 by broadcasting this information in beacon frames 305 and probe response information elements. Alternatively, the ID field 614 may comprise a value suitable for identifying the information element as a category of information elements that may be used by multiple protocols, and the OUI field 618 may comprise a value suitable for identifying the information element as being utilized for setup. The configuration type field 620 may comprise 8 bits of binary information, for example, and may be vendor specific. The configuration subtype field 622 may comprise 8 bits of binary information, for example, and may be vendor specific. The version field 624 may comprise 8 bits of binary information, for example, and may comprise a value suitable for distinguishing different versions of the SP IE 612. The data field 626 may comprise 8 bits of binary information, for example, to provide authorization enablement information that may be utilized by a client station that is being configured and authenticated utilizing a configuration protocol.

Figure 6C:
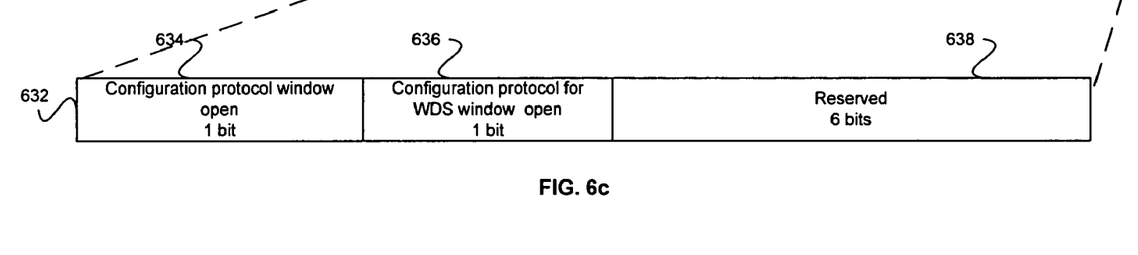
FIG. 6c is a diagram of an exemplary configuration protocol data field format, in accordance with an embodiment of the invention.

FIG. 6c is a diagram of an exemplary configuration protocol data field format, in accordance with an embodiment of the invention. With reference to FIG. 6c there is shown a configuration protocol data field 632. The configuration protocol data field 632 may comprise a configuration protocol window open field 634, a configuration protocol for wireless distribution system (WDS) window open field 636 and a reserved field 638 reserved for future use. The configuration protocol window open field 634 may comprise 1 bit of binary information, for example, and may comprise information suitable for specifying a configurator timing window to a client station, such as, for example, client station 104. The configuration protocol window open field 634 may be set to 1, for example, if the configuration protocol window is currently open for a configuration protocol client, for example, client station 104 and may be set to 0, for example, otherwise. The configuration protocol window open field 634 may indicate whether the configurator timing window is open, or closed. In this regard, the configuration protocol open window field 634 may specify a time period during which configuration is allowed. The configuration protocol for wireless distribution system (WDS) window open field 636 may be set to 1, for example, if the configuration protocol window is currently open for a configuration protocol WDS client and may be set to 0, for example, otherwise. The reserved field may comprise 6 bits of binary information, for example, and may utilized for future use. The configurator, for example, AP 102 functioning as a configurator may indicate a recently configured state if none of the bits in the SP IE field 612 are set to 1, for example. The recently configured state may indicate whether the configurator has already configured another client during the current configuration protocol window opening period.

In operation, when the configurator timing window is open, a client, such as, for example, client station 104, may be permitted to utilize a configurator, such as, for example, AP 102 functioning as a configurator station 102, for configuration and authentication based on a configuration protocol. If the configurator timing window is closed, a client may not be permitted to utilize the configurator for configuration and authentication based on a configuration protocol. The amount of time that may transpire between when a configurator timing window is open and when the configurator timing window is subsequently closed may be determined during configuration of the configurator. If the client expected to be configured during the current configurator timing window but was unable to do so as a result of information in the recently configured field, the client may report that an unintended client may have utilized the configurator for configuration and authentication based on a configuration protocol.

Figure 7A:
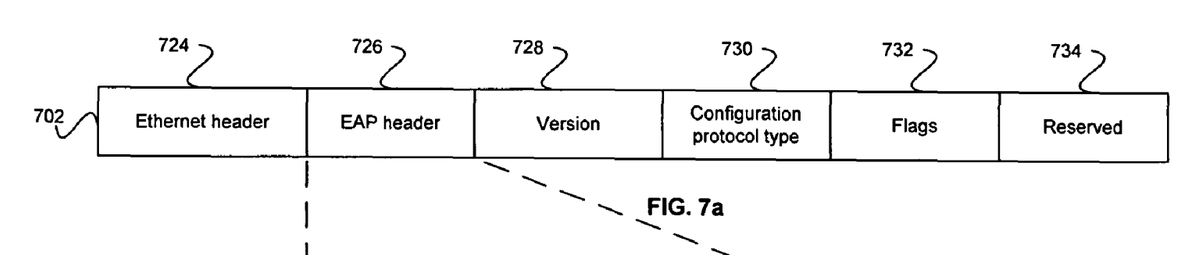
FIG. 7a is a diagram of an exemplary configuration protocol packet header format, in accordance with an embodiment of the invention.

FIG. 7a is a diagram of an exemplary configuration protocol packet header format, in accordance with an embodiment of the invention. With reference to FIG. 7a, there is shown configuration protocol packet header format 702. The configuration protocol packet header 702 may comprise an Ethernet header field 724, an extensible authentication protocol (EAP) header field 726, a version field 728, a configuration protocol type field 730, a flags field 732 and a reserved field 734 for future use. The Ethernet header field 724 may comprise an Ethernet destination address and an Ethernet source address, for example. The EAP header field 726 may comprise data that specifies the version, type and length of the EAP header. The version field 728 may comprise information that identifies the version of the configuration protocol packet header 702. The configuration protocol type field 730 may comprise information that identifies the packet type of the configuration protocol. The configuration protocol type field 730 may indicate a type of transmitted message between the configurator 208 and the client station 204. For example, a hello message as illustrated in step 316, a public key 1 message as illustrated in step 318, a public key 2 message as illustrated in step 320, a SSID/passphrase message as illustrated in step 322 or a status message 324. The flags field 732 may comprise 8 bits of binary information, for example, and may be adapted to provide additional information pertaining to a configuration protocol at the configurator.

Figure 7B:
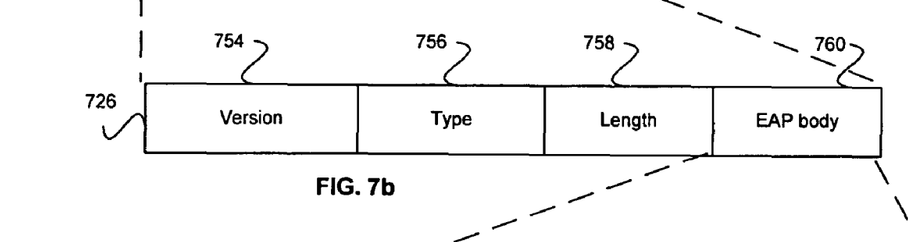
FIG. 7b is a diagram of an exemplary EAP header message format for a configuration protocol, in accordance with an embodiment of the invention.

FIG. 7b is a diagram of an exemplary EAP header message format for a configuration protocol, in accordance with an embodiment of the invention. With reference to FIG. 7b, there is shown an EAP header 726. The EAP header 726 may comprise a version field 754, a packet type field 756, a packet length field 758 and an EAP body field 760. The version field 754 may comprise 8 bits of binary information, for example, that indicates the version of the extensible authentication protocol over LAN (EAPOL). The packet type field 756 may comprise 8 bits of binary information, for example, that indicates the type of the EAPOL packet utilized. The packet length field 758 may comprise 16 bits of binary information, for example, that indicates the length of the configuration protocol packet header 702. The EAP header body field 760 may comprise data that indicates the EAP version, EAP type and EAP length of the configuration protocol packet header 702.

Figure 7C:
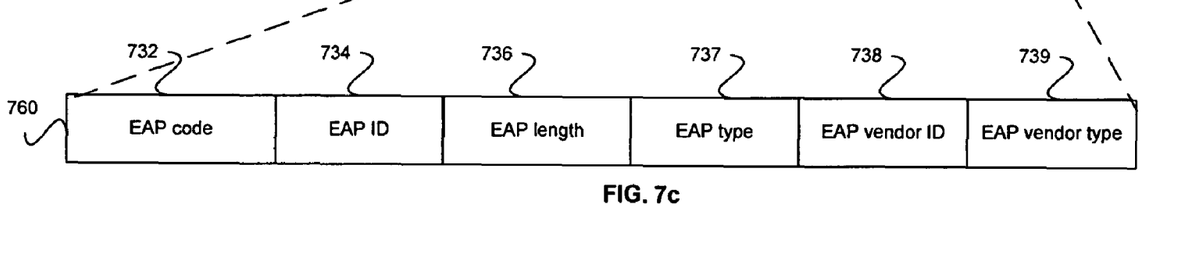
FIG. 7c is a diagram of an exemplary EAP header body format for a configuration protocol, in accordance with an embodiment of the invention.

FIG. 7c is a diagram of an exemplary EAP header body format for a configuration protocol, in accordance with an embodiment of the invention. With reference to FIG. 7c, there is shown an EAP header body field 760. The EAP header body field 760 comprises an EAP code field 732, an EAP ID field 734, an EAP length field 736, an EAP type field 737, EAP vendor ID field 738 and an EAP vendor type field 739. The EAP code field 732 may comprise information that indicates whether the EAP packet is a request identity packet or a response identity packet. For example, an access point 102 may communicate a request-identity EAP packet to the client station 104 to identify the client station trying to access the AP 102. The client station 104 may respond by communicating a response-identity EAP packet to the AP 102 confirming its identity. The EAP ID field 734 may comprise information that indicates the current identity of the request-identity EAP packet. The EAP length field 736 may comprise information that indicates the length of the EAP header field 726. The EAP type field 737 may comprise information that indicates the type of EAP packet. The EAP vendor ID field 738 may comprise 24 bits of binary information, for example, that indicates the vendor ID of the EAP packet. The EAP vendor type field 739 may comprise 32 bits of information, for example, that indicates the vendor type of the EAP packet.

Figure 7D:
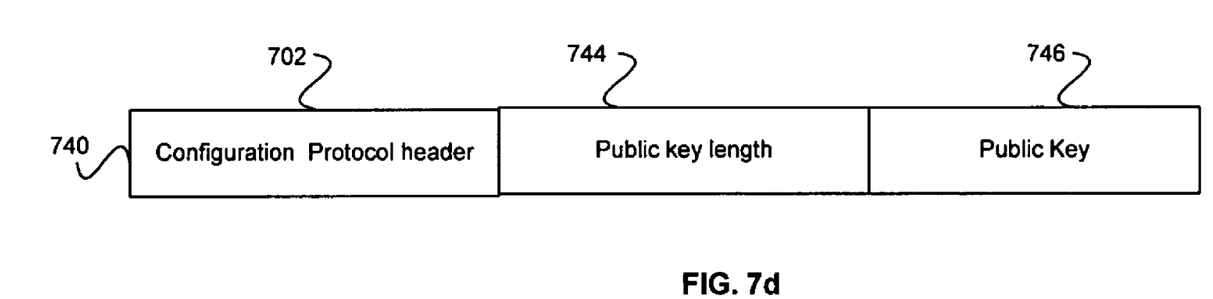
FIG. 7*d* is a diagram illustrating an exemplary configuration protocol packet type key format, in accordance with an embodiment of the invention.

FIG. 7d is a diagram illustrating an exemplary configuration protocol packet type key format, in accordance with an embodiment of the invention. With reference to FIG. 7d, there is shown a configuration protocol packet type key format 740. The configuration protocol packet type key 740 comprises a configuration protocol header 702, a public key length 744 and a public key 746. The configuration protocol packet type key 1 and the configuration protocol packet type key 2 may have a format similar to the configuration protocol packet type key format 740. The configuration protocol header 702 is substantially as described in FIG. 7a. The public key length field 744 may comprise information that indicates the length of the public key utilized. The public key field 746 may comprise algorithm information that specifies the public key 1 for the configuration protocol packet type key 1 or public key 2 for the configuration protocol packet type key 2. For example, an encryption type may be specified during setup configuration and authorization of the client such as, for example, the Diffie-Hellman (DH) algorithm. The public key field 746 for the public key 1 message may comprise the configurator's generated public key for algorithm information exchange, for example, DH algorithm information exchange. The public key field 746 for the public key 2 message may comprise the client's generated public key for algorithm information exchange, for example, DH algorithm information exchange. The client, for example, client station 104 may transmit a public key 2 message as illustrated in step 324 in response to a transmitted public key 1 message as illustrated in step 322 previously received from a configurator. The public key 2 message may be transmitted as plaintext.

Figure 7E:
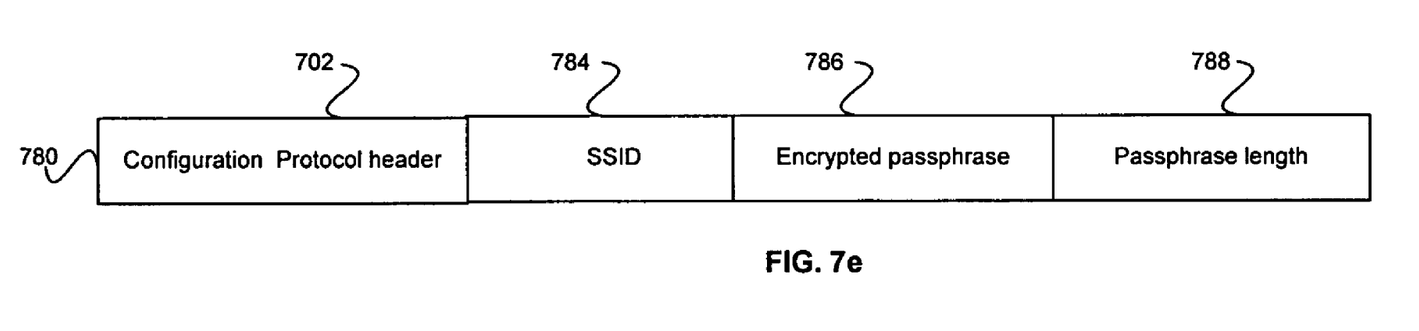
FIG. 7*e* is a diagram illustrating an exemplary configuration protocol packet type info format, in accordance with an embodiment of the invention.

FIG. 7e is a diagram illustrating an exemplary configuration protocol packet type info format, in accordance with an embodiment of the invention. With reference to FIG. 7d, there is shown configuration protocol packet type info format 750. The configuration protocol packet type info format 780 comprises a configuration protocol header 702, a service set identifier (SSID) field 784, an encrypted passphrase field 786 and a passphrase length field 788.

The SSID field 784 may comprise a unique identifier attached to the header of the configuration protocol packets sent over a WLAN that may act as a password when a client station, for example, client station 104 tries to connect to the BSS, for example, BSS 202. The SSID field 784 may comprise information that indicates the SSID of the secure configuration protocol network. The SSID field 784 may specify an ESS, such as, for example, ESS 220, to which the client may become a member. The encrypted passphrase field 786 may comprise information that is utilized to configure the client based on a configuration protocol. The encrypted passphrase field 786 may be randomly generated at the AP 102 and transmitted to the client 104 in an encrypted format. The key for the encryption may be derived using the Diffie-Hellman (DH) protocol or its variant, for example. The DH protocol may generate a shared 1536-bit key, for example. This key may be converted to a 128-bit key using an encryption algorithm such as secure hass access 1 (SHA1), for example. The 128-bit key may be utilized for advanced encryption standard (AES) wrapping of the encrypted passphrase before being transmitted over the air. The encrypted passphrase field 786 may specify, as ciphertext, a secret key that may be utilized by the client to establish secure communications in an IEEE 802.11 WLAN. The encrypted passphrase field 786 may be decrypted based on the exchange of shared keys in the public key 1 message and the public key 2 message. The passphrase length field 788 may comprise information that indicates the length of the encrypted passphrase.

A configuration protocol packet type hello may be communicated from the client to the configurator to inform the configurator that the client is ready for exchange of packets. The configuration protocol packet type key 1 may be communicated by the configurator to the client in response to receiving the configuration protocol packet type hello from the client. The configuration protocol packet type key 2 may be communicated by the client to the configurator in response to receiving the configuration protocol packet type key 1 from the configurator. After the configuration protocol packet type key 1 and configuration protocol packet type key 2 have been exchanged, the configurator and client may calculate a shared secret key that may be utilized to encrypt the configuration information. The configuration protocol packet type info may be communicated by the configurator to the client in response to receiving the configuration protocol packet type key 2 from the client. The configuration protocol packet type status may be communicated by the client to the configurator in response to receiving the configuration protocol packet type info from the configurator. The configuration protocol packet type status may indicate the status of exchange of the configuration protocol messages. If the client successfully receives and decrypts the configuration information in the configuration protocol packet type info message, the client may communicate a configuration protocol packet type status message indicating a success of exchange of messages.

If the client did not receive the configuration protocol packet type info or is unable to decrypt the configuration information in the configuration protocol packet type info message, the client may communicate a configuration protocol packet type status message indicating a failure of exchange of messages. The configuration protocol packet type status may be communicated by the configurator 208 or the client station 204 at anytime to terminate the exchange of messages between the configurator 208 and the client station 204, if required. A configuration protocol packet type echo request may be communicated by the client to the configurator during link verification and wired discovery. A configuration protocol packet type echo response may be communicated by the configurator to the client during link verification and wired discovery in response to a received configuration protocol packet type echo request from the client. The configuration protocol exchange is substantially as described in FIG. 3.

Certain aspects of a method and system for enabling exchange of information in a secure communication system may comprise at least one configuration processor, for example, configuration processor 230 that uses authentication enablement information comprising data that specifies a time period during which configuration of at least one WLAN client station, for example, client station 204 is allowed. The data that specifies a time period during which configuration is allowed may comprise a configuration protocol window open field 634, which indicates a period when a configuration setup window is open. At least one client station, for example, client station 204 may be configured via the authentication enablement information comprising recently configured data, which indicates whether at least one configurator has configured at least one other client station within the time period during which the configuration is allowed.

The authentication enablement information may comprise recently configured data for configuring the client station 204, which indicates whether the configurator 208 has configured at least one other client station, for example, client station 206 during the configuration setup window opening period. The configuration of the client station 204 may be disallowed if the recently configured data indicates configuration of at least one other client station, for example, client station 206 by the configurator 208 within the time period during which the configuration is allowed. The authentication enablement information may comprise at least one version field, for example, version field 624, which indicates a version of a configuration protocol that is utilized to configure the client station 204.

The configuration protocol version field 624 may comprise 6 bits of binary information, for example, and may comprise information suitable for distinguishing different versions of a configuration protocol. The configuration protocol window open field 634 may comprise 1 bit of binary information, for example, and may comprise information suitable for specifying a configurator timing window to a client station, such as, for example, client station 104. The configuration protocol window open field 634 may indicate whether the configurator timing window is open, or closed. The authentication enablement information may further comprise an encrypted passphrase, for example, the encrypted passphrase field 786, which authenticates the WLAN client station 204. The encrypted passphrase field 786 may be generated by an encryption algorithm, for example, the Diffie-Hellman (DH) algorithm. The public key field 746 for the public key 1 message may comprise the configurator's generated public key for algorithm information exchange, for example, DH algorithm information exchange. The public key field 746 for the public key 2 message may comprise the client's generated public key for algorithm information exchange, for example, DH algorithm information exchange. The client, for example, client station 104 may transmit a public key 2 message as illustrated in step 324 in response to a transmitted public key 1 message as illustrated in step 322 previously received from a configurator. The public key 2 message may be transmitted as plaintext.

The authentication enablement information may further comprise at least one service identifier, for example the SSID field 784, which identifies the WLAN client station 204. The configuration processor 230 may be adapted to authenticate the WLAN client station 204 via the authentication enablement information by exchanging a plurality of public keys. The authentication enablement information may further comprise status data, which indicates a status of messages exchanged between at least one configurator, for example, configurator 208 and at least one WLAN client station, for example, client station 204.

The authentication enablement information may further comprise at least one service identifier, for example the SSID field 784, which identifies the 802.11 client station 204. The configuration processor 230 may be adapted to authenticate the 802.11 client station 204 via the authentication enablement information by exchanging a plurality of public keys. The authentication enablement information may further comprise status data, which indicates a status of messages exchanged between at least one configurator, for example, configurator 208 and at least one 802.11 client station, for example, client station 204.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for enabling exchange of information in a secure communication system, the method comprising:
configuring at least one wireless LAN (WLAN) client station based on authentication enablement information, wherein said authentication enablement information specifies a time period during which said configuration is allowed and indicates whether at least one other WLAN client station has been configured within said time period.

2. The method according to claim 1, wherein said authentication enablement information comprises a configuration window open field that indicates a period when a configuration setup window is open.

3. The method according to claim 2, comprising configuring said at least one WLAN client station based on recently configured data that indicates whether at least one configurator has configured said at least one other WLAN client station within said time period during which said configuration is allowed.

4. The method according to claim 3, comprising disallowing said configuration of said at least one WLAN client station if said recently configured data indicates said configuration of said at least one other WLAN client station within said time period during which said configuration is allowed.

5. The method according to claim 1, comprising configuring said at least one WLAN client station based on version data that indicates a version of a configuration protocol.

6. The method according to claim 1, comprising authenticating said at least one WLAN client station based on an encrypted passphrase.

7. The method according to claim 6, wherein said encrypted passphrase is generated by an encryption algorithm.

8. The method according to claim 1, comprising identifying said at least one WLAN client station based on at least one service set identifier.

9. The method according to claim 1, comprising authenticating said at least one WLAN client station based on exchanging a plurality of public keys.

10. The method according to claim 1, comprising configuring said at least one WLAN client station based on status data that indicates a status of messages exchanged between at least one configurator and said at least one WLAN client station.

11. A system for enabling exchange of information in a secure communication system, the system comprising:
one or more processors that are operable to configure at least one wireless LAN (WLAN) client station based on authentication enablement information, wherein said authentication enablement information specifies a time period during which said configuration is allowed and indicates whether at least one other WLAN client station has been configured within said time period.

12. The system according to claim 11, wherein said authentication enablement information specifies a configuration window open field that indicates a period when a configuration setup window for at least one configurator is open.

13. The system according to claim 12, wherein said one or more processors are operable to configure said at least one WLAN client station based on recently configured data that indicates whether said at least one configurator has configured said at least one other WLAN client station during said configuration setup window opening period.

14. The system according to claim 13, wherein said one or more processors are operable to disallow said configuration of said at least one WLAN client station, if said recently configured data indicates said configuration of said at least one other WLAN client station within said time period during which said configuration is allowed.

15. The system according to claim 11, wherein said one or more processors are operable to configure said at least one WLAN client station based on at least one version field that indicates a version of a configuration protocol that is utilized to configure said at least one WLAN client station.

16. The system according to claim 11, wherein said one or more processors are operable to configure said at least one WLAN client station based on an encrypted passphrase that authenticates said at least one WLAN client station.

17. The system according to claim 16, wherein said encrypted passphrase is generated by an encryption algorithm.

18. The system according to claim 11, wherein said one or more processors are operable to configure said at least one WLAN client station based on at least one service identifier that identifies said at least one WLAN client station.

19. The system according to claim 11, wherein said one or more processors are operable to authenticates said at least one WLAN client station based on exchanging a plurality of public keys.

20. The system according to claim 11, wherein said one or more processors are operable to configure said at least one WLAN client station based on status data that indicates a status of messages exchanged between at least one configurator and said at least one WLAN client station.

21. A method for enabling exchange of information in a secure communication system, the method comprising:
configuring at least one wireless LAN (WLAN) client station based on authentication enablement information comprising data that specifies a time period during which said configuration is allowed, wherein said data that specifies a time period during which said configuration is allowed comprises a configuration window open field that indicates a period when a configuration setup window is open; and configuring said at least one WLAN client station based on said authentication enablement information comprising recently configured data that indicates whether at least one configurator has configured said at least one other WLAN client station within said time period during which said configuration is allowed.

22. The method according to claim 21, comprising disallowing said configuration of said at least one WLAN client station if said recently configured data indicates said configuration of said at least one other WLAN client station within said time period during which said configuration is allowed.

23. A system for enabling exchange of information in a secure communication system, the system comprising:

one or more processors that are operable to configure at least one wireless LAN (WLAN) client station based on authentication enablement information comprising data that specifies a time period during which said configuration is allowed, wherein said data that specifies a time period during which said configuration is allowed comprises a configuration window open field that indicates a period when a configuration setup window is open; and said one or more processors are operable to configure said at least one WLAN client station based on said authentication enablement information comprising recently configured data that indicates whether at least one configurator has configured said at least one other WLAN client station within said time period during which said configuration is allowed.

24. The system according to claim 23, wherein said one or more processors are operable to disallow said configuration of said at least one WLAN client station if said recently configured data indicates said configuration of said at least one other WLAN client station within said time period during which said configuration is allowed.

* * * * *